US012044476B2

(12) United States Patent
Son et al.

(10) Patent No.: US 12,044,476 B2
(45) **Date of Patent: *Jul. 23, 2024**

(54) ADJUSTABLE KILN FLIGHT FOR ROTARY KILN DECOATER AND ASSOCIATED METHOD

(71) Applicant: Novelis Inc., Atlanta, GA (US)

(72) Inventors: JungYoung Son, Ulsan (KR); Cameron Koentopp, Spokane, WA (US)

(73) Assignee: Novelis Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,509

(22) Filed: Nov. 17, 2022

(65) Prior Publication Data

US 2023/0073543 A1 Mar. 9, 2023

Related U.S. Application Data

(63) Continuation of application No. 16/532,822, filed on Aug. 6, 2019, now Pat. No. 11,543,184.

(Continued)

(51) Int. Cl.
*F27B 7/16* (2006.01)
*F27B 7/18* (2006.01)

(52) U.S. Cl.
CPC ................ *F27B 7/18* (2013.01); *F27B 7/162* (2013.01)

(58) Field of Classification Search
CPC ........ F23G 2203/208; F27B 7/14; F27B 7/16; F27B 7/161; F27B 7/162; F27B 7/18; E01C 2019/109; F26B 11/0477

(Continued)

(56) References Cited

U.S. PATENT DOCUMENTS 2,506,739 A * 5/1950 Raypholtz ............... E01C 19/05 34/137
3,025,611 A * 3/1962 Preeman ................. E01C 19/05 34/109

(Continued)

FOREIGN PATENT DOCUMENTS

CN 102721275 A 10/2012
CN 103244521 A 8/2013

(Continued)

OTHER PUBLICATIONS

U.S. Appl. No. 16/532,822 , “Advisory Action”, Aug. 1, 2022, 4 pages.

(Continued)

*Primary Examiner* — Ko-Wei Lin
(74) *Attorney, Agent, or Firm* — Kilpatrick Townsend & Stockton LLP

(57) ABSTRACT

Disclosed are adjustable kiln flights for rotary kilns and associated methods. The kiln flight includes a base configured to be secured to a rotary kiln surface of a rotary kiln. In some aspects, the kiln flight includes a flight body rotatably supported on the base such that an angular orientation of the flight body is adjustable. In various examples, the kiln flight includes a height adjuster movably supported relative to the base such that a height of the kiln flight is adjustable. A method of controlling a rotary kiln with the adjustable kiln flight includes supporting a kiln flight on a base that is secured to an inner kiln surface of a rotary kiln, and adjusting at least one of the angular orientation of the kiln flight or the height of the kiln flight.

20 Claims, 8 Drawing Sheets

Related U.S. Application Data

(60) Provisional application No. 62/715,333, filed on Aug. 7, 2018.

(58) Field of Classification Search
USPC .................................... 34/135–137; 432/118
See application file for complete search history.

(56) References Cited

U.S. PATENT DOCUMENTS

| | | | | | |
|---|---|---|---|---|---|
| 3,076,270 | A * | 2/1963 | Madsen | F26B 11/0477 | 209/290 |
| 3,641,683 | A * | 2/1972 | Preeman | E01C 19/05 | 432/118 |
| 3,799,735 | A | 3/1974 | Jensen | | |
| 4,172,701 | A | 10/1979 | Bernt | | |
| 4,193,208 | A * | 3/1980 | Ronning | F26B 11/0477 | 366/225 |
| 4,307,520 | A * | 12/1981 | Lutz | F26B 11/0463 | 432/118 |
| 4,338,732 | A * | 7/1982 | Coxhill | F26B 11/0477 | 432/118 |
| 4,383,379 | A * | 5/1983 | Avril | E01C 19/05 | 34/135 |
| 4,391,206 | A * | 7/1983 | Matteini | F23G 5/20 | 432/118 |
| 4,628,614 | A * | 12/1986 | Thompson | F26B 11/0477 | 34/387 |
| 4,860,462 | A * | 8/1989 | Gobel | F26B 11/0477 | 34/108 |
| 5,083,382 | A * | 1/1992 | Brashears | F26B 11/0463 | 432/118 |
| 5,157,849 | A * | 10/1992 | Ronning | F26B 11/0477 | 34/135 |
| 5,203,693 | A * | 4/1993 | Swanson | F26B 11/0477 | 432/118 |
| 5,380,084 | A * | 1/1995 | Milstead | B01F 27/112 | 432/118 |
| 5,454,176 | A * | 10/1995 | Gobel | F26B 17/106 | 432/118 |
| 5,480,226 | A * | 1/1996 | Milstead | F26B 11/0477 | 366/7 |
| 5,515,620 | A * | 5/1996 | Butler | F26B 11/0477 | 432/118 |
| 6,110,430 | A * | 8/2000 | Swisher, Jr. | B09C 1/06 | 422/198 |
| 6,132,560 | A * | 10/2000 | Gerstenkorn | C10B 39/10 | 432/118 |
| 6,726,351 | B2 * | 4/2004 | Dillman | F26B 11/0477 | 432/118 |
| 8,172,448 | B1 * | 5/2012 | Hudman | E01C 19/1027 | 432/118 |
| 2003/0227815 | A1 * | 12/2003 | Dillman | E01C 19/1063 | 34/137 |
| 2014/0331512 | A1 * | 11/2014 | Yamashiro | F27B 7/02 | 432/112 |

FOREIGN PATENT DOCUMENTS

| | | | |
|---|---|---|---|
| CN | 103743228 | A | 4/2014 |
| CN | 104745341 | A | 7/2015 |
| CN | 105424355 | A | 3/2016 |
| EP | 3444549 | A1 | 2/2019 |
| JP | 2009114790 | A | 5/2009 |

OTHER PUBLICATIONS

U.S. Appl. No. 16/532,822 , "Final Office Action", May 11, 2022, 16 pages.
U.S. Appl. No. 16/532,822 , "First Action Interview Office Action Summary", Mar. 2, 2022, 4 pages.
U.S. Appl. No. 16/532,822 , "First Action Interview Pilot Program Pre-Interview Communication", Dec. 29, 2021, 5 pages.
U.S. Appl. No. 16/532,822 , "Notice of Allowance", Oct. 21, 2022, 9 pages.
CN201980065077.8 , "Office Action", May 11, 2022, 21 pages.
CN201980065077.8 , "Office Action", Oct. 20, 2022, 6 pages.
IN202117005609 , "First Examination Report", Aug. 8, 2022, 6 pages.
KR10-2021-7006435 , "Office Action", Jun. 29, 2022, 14 pages.
PCT/US2019/045244 , "International Preliminary Report on Patentability", Feb. 18, 2021, 10 pages.
PCT/US2019/045244 , "International Search Report and Written Opinion", Oct. 7, 2019, 14 pages.
BR112021001937-5 , "Office Action", Jan. 24, 2023, 4 pages.
CN201980065077.8 , "Notice of Decision to Grant", Mar. 19, 2023, 4 pages.
KR10-2021-7006435 , "Office Action", May 22, 2023, 4 pages.
KR10-2021-7006435 , "Office Action", Jan. 19, 2023, 7 pages.
BR112021001937-5 , "Notice of Allowance", Nov. 7, 2023.
KR10-2023-7026331, "Office Action", Oct. 6, 2023, 6 pages.

* cited by examiner

ADJUSTABLE KILN FLIGHT FOR ROTARY KILN DECOATER AND ASSOCIATED METHOD

REFERENCE TO RELATED APPLICATION

This application is a continuation of U.S. application Ser. No. 16/532,822, filed on Aug. 6, 2019 and entitled ADJUSTABLE KILN FLIGHT FOR ROTARY KILN DECOATER AND ASSOCIATED METHOD, which claims the benefit of U.S. Provisional Application No. 62/715,333, filed on Aug. 7, 2018 and entitled ADJUSTABLE KILN LIFTER FOR ROTARY KILN DECOATER AND ASSOCIATED METHODS, both of which are hereby incorporated by reference in their entireties.

FIELD OF THE INVENTION

This application relates to rotary kilns, and more particularly to adjustable flights for rotary kilns.

BACKGROUND

Rotary kilns are used in various applications including, but not limited to, metal recycling, mixing, garbage incinerating, scrap drying, and various other applications. As one non-limiting example, during metal recycling, such as recycling aluminum (including aluminum alloys), organic coatings, such as paints, lacquers, and the like must be removed with a decoating process to prevent violent gas evolution during recycling processing. As part of the decoating process, the metal scrap is mixed in a decoating kiln, which is a thermodynamic heat exchanger that uses recirculating hot gas to exchange heat with metal scrap to remove the coatings from the scrap. Kiln flights within the kiln lift up and then drop the scrap to distribute the metal scrap within the kiln for heat exchange with the hot gas and to make the scrap advance. However, existing kiln flights are a solid piece welded to the kiln barrel, and as such offer limited to no control of heat flux of the hot gas in the kiln and cannot be adjusted for various types of incoming scrap material at various contamination levels.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some examples, a kiln flight for a rotary kiln includes a base configured to be secured to a rotary kiln surface and a flight body rotatably supported on the base such that an angular orientation of the flight body is adjustable.

In certain cases, the angular orientation of the flight body is adjustable between a maximum position and a base position. In various aspects, a difference between the maximum position and the base position is from about 0° to about 30°. In certain examples, the difference between the maximum position and the base position is from about 13° to about 15°. According to various aspects, the base includes a plurality of openings, such as slots, and the flight body includes a plurality of supports, each support movable within a corresponding opening such that the angular orientation of the flight body is adjustable.

In some examples, the kiln flight includes a height adjuster movably supported on the flight body such that a height of the kiln flight is adjustable. In various examples, the flight body defines a plurality of height slots, and the height adjuster includes a plurality of height supports, each height support movable within a corresponding height opening such that the height of the kiln flight is adjustable. In certain examples, the height adjuster is slidably supported on the flight body. In some cases, the height adjuster includes an upper edge, and a distance from the upper edge to the base is the height of the kiln flight. According to various aspects, the height adjuster includes a first portion and a second portion where the second portion includes the upper edge, the first portion is slidably supported on the flight body, and the second portion and first portion are non-coplanar.

According to various examples, a kiln flight for a rotary kiln includes a base configured to be secured to a rotary kiln surface and a height adjuster movably supported relative to the base and comprising an upper edge. A distance from the upper edge to the base is a height of the kiln flight, and the height adjuster is movable relative to the base such that the height of the kiln flight is adjustable.

In some aspects, the height adjuster includes a first portion and a second portion where the second portion includes the upper edge, and the second portion and the first portion are non-coplanar. In some cases, the kiln flight includes a flight body rotatably supported on the base such that an angular orientation of the flight body is adjustable. In various aspects, the height adjuster is movably supported to the flight body. According to certain examples, the angular orientation of the flight body is adjustable between a maximum position and a base position. In certain cases, a difference between the maximum position and the base position is from about 0° to about 30°, such as from about 13° to about 15°.

In some cases, the base includes a plurality of openings and the flight body includes a plurality of supports, and each support is movable within a corresponding opening such that the angular orientation of the flight body is adjustable. In certain examples, the flight body defines a plurality of height slots, and the height adjuster includes a plurality of height supports, each height support movable within a corresponding height opening such that the height of the kiln flight is adjustable. In various aspects, the height adjuster is slidably supported on the flight body. In certain examples, the height of the kiln flight is adjustable between a maximum height and a minimum height.

According to certain examples, a rotary kiln system includes a rotary kiln comprising an inner kiln surface and defining a central axis and an adjustable kiln flight. The adjustable kiln flight includes a base secured to the inner kiln surface and a flight body rotatably supported on the base such that an angular orientation of the flight body relative to the central axis is adjustable.

In various cases, the angular orientation of the flight body is adjustable between a maximum position and a base position relative to the central axis. In certain cases, a difference between the maximum position and the base position is from about 0° to about 30°, such as from about 13° to about 15°. In certain aspects, the base includes a plurality of openings, and the flight body includes a plurality of supports, each support movable within a corresponding opening such that the angular orientation of the flight body is adjustable. According to some aspects, the adjustable kiln flight further includes a height adjuster, and the height adjuster includes an upper edge. A distance from the upper edge to the inner kiln surface is a height of the adjustable kiln flight, and in some cases, the height adjuster is movably supported on the flight body such that the height of the adjustable kiln flight is adjustable.

In some examples, the flight body defines a plurality of height slots, and the height adjuster includes a plurality of height supports, each height support movable within a corresponding height opening such that the height of the adjustable kiln flight is adjustable. In some aspects, the height adjuster is slidably supported on the flight body. In various examples, the height adjuster includes a first portion and a second portion, the second portion includes the upper edge, the first portion is slidably supported on the flight body, and the second portion and the first portion are non-coplanar. In certain cases, the base is welded to the inner kiln surface.

In various aspects, the adjustable kiln flight is a first adjustable kiln flight of a plurality of adjustable kiln flights arranged on the inner kiln surface. According to some examples, the rotary kiln includes a first zone and a second zone each including adjustable kiln flights. In certain cases, the angular orientation of the adjustable kiln flights in the first zone is a first angular orientation, and the angular orientation of the adjustable kiln flights in the second zone is a second angular orientation different from the first angular orientation.

According to some aspects, a rotary kiln system includes a rotary kiln with an inner kiln surface, and an adjustable kiln flight that includes a base secured to the inner kiln surface and a height adjuster movably supported relative to the base. The height adjuster includes an upper edge, a distance from the upper edge to the inner kiln surface is a height of the adjustable kiln flight, and the height adjuster is movable relative to the base such that the height of the adjustable kiln flight is adjustable.

In certain cases, the height adjuster includes a first portion and a second portion, the second portion includes the upper edge, and the second portion and the first portion are non-coplanar. In some examples, the rotary kiln defines a central axis and the adjustable kiln flight further includes a flight body rotatably supported on the base such that an angular orientation of the flight body relative to the central axis is adjustable. In some cases, the height adjuster is movably supported to the flight body.

According to some cases, the angular orientation of the flight body is adjustable between a maximum position and a base position. In certain aspects, a difference between the maximum position and the base position is from about 0° to about 30°, such as from about 13° to about 15°. In various examples, the base includes a plurality of openings, and the flight body includes a plurality of supports, each support movable within a corresponding opening such that the angular orientation of the flight body is adjustable. In some aspects, the flight body defines a plurality of height slots, and the height adjuster includes a plurality of height supports, each height support movable within a corresponding height opening such that the height of the adjustable kiln flight is adjustable. In certain cases, the height adjuster is slidably supported on the flight body. According to some examples, the height of the adjustable kiln flight is adjustable between a maximum height and a minimum height.

In certain examples, the base is welded to the inner kiln surface. According to various examples, the adjustable kiln flight is a first adjustable kiln flight of a plurality of adjustable kiln flights arranged on the inner kiln surface. In some cases, the rotary kiln includes a first zone and a second zone each including adjustable kiln flights. In various aspects, the height of the adjustable kiln flights in the first zone is a first height, and the height of adjustable kiln flights in the second zone is a second height different from the first height.

According to certain cases, a method of controlling a rotary kiln includes supporting a kiln flight on a base that is secured to an inner kiln surface of a rotary kiln, and adjusting a height of the kiln flight relative to the inner kiln surface after supporting the kiln flight on the base. The height of the kiln flight is a distance between an upper edge of the kiln flight and the inner kiln surface.

In some cases, the method includes adjusting an angular orientation of the kiln flight relative to the base. In various examples, adjusting the angular orientation includes rotating a flight body of the kiln flight relative to the base. In various aspects, the kiln flight is a first kiln flight of a plurality of kiln flights, and adjusting the height of the kiln flight includes adjusting the height of each kiln flight of the plurality of kiln flights. In certain aspects, adjusting the height of each kiln flight includes adjusting kiln flights in a first zone of the rotary kiln to a first height and adjusting kiln flights in a second zone of the rotary kiln to a second height different from the first height.

According to various aspects, a method of controlling a rotary kiln includes supporting a kiln flight on a base that is secured to an inner kiln surface of a rotary kiln, and adjusting an angular orientation of the kiln flight relative to a central axis of the rotary kiln after supporting the kiln flight on the base.

In various examples, adjusting the angular orientation includes rotating a flight body of the kiln flight relative to the base. In some aspects, the method includes adjusting a height of the kiln flight relative to the inner kiln surface after supporting the kiln flight on the base, and the height of the kiln flight is a distance between an upper edge of the kiln flight and the inner kiln surface. In some examples, the kiln flight is a first kiln flight of a plurality of kiln flights, and adjusting the angular orientation of the kiln flight includes adjusting the angular orientation of each kiln flight of the plurality of kiln flights. In various aspects, adjusting the angular orientation of each kiln flight of the plurality of kiln flights includes adjusting kiln flights in a first zone of the rotary kiln to a first angular orientation and adjusting kiln flights in a second zone of the rotary kiln to a second angular orientation different from the first angular orientation.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
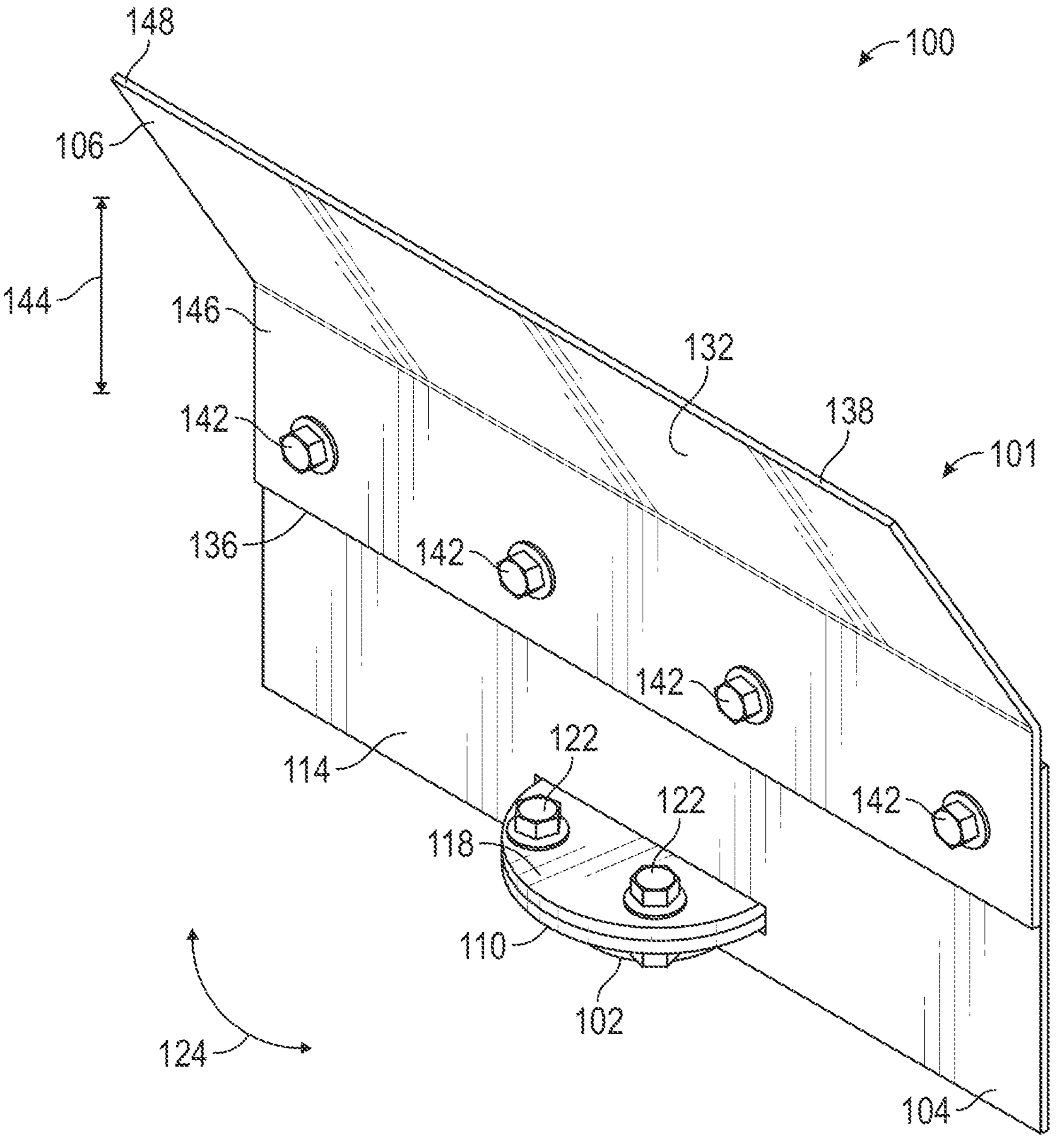
FIG. 1 is a front perspective view of a kiln flight according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

In some aspects, disclosed is an adjustable flight for a rotary kiln, such as a decoating rotary kiln. The adjustable flight includes a base, a flight body, and a height adjuster. In certain examples, the flight body is rotatable relative to the base such that an angular orientation of the flight is adjustable. In various aspects, the height adjuster is linearly movable relative to the base such that a height of the adjuster is adjustable. In certain cases, the flight body is removably attached to the base such that the flight body can be replaced or exchanged with a similar or different flight body and adjustable as desired. Through the adjustable flight, a residence time of material within the rotary kiln may be controlled and adjusted as desired.

FIGS. 1-8 illustrate an example of a flight 100 according to aspects of the present disclosure. The flight 100 includes a base 102 and a body assembly 101 that includes a flight body 104 and a height adjuster 106. The body assembly 101 is movable relative to the base 102. In some examples, and as described in detail below, the flight body 104 is rotatably supported on the base 102 such that an angular orientation of the flight body 104 is adjustable. In various aspects, and as described in detail below, the height adjuster 106 is linearly adjustable relative to the base 102 such that a height of the flight 100 is adjustable. In other examples, the flight 100 need not be both rotatably and linearly adjustable (e.g., the flight 100 is only linearly adjustable or only rotatably adjustable).

Figure 3:
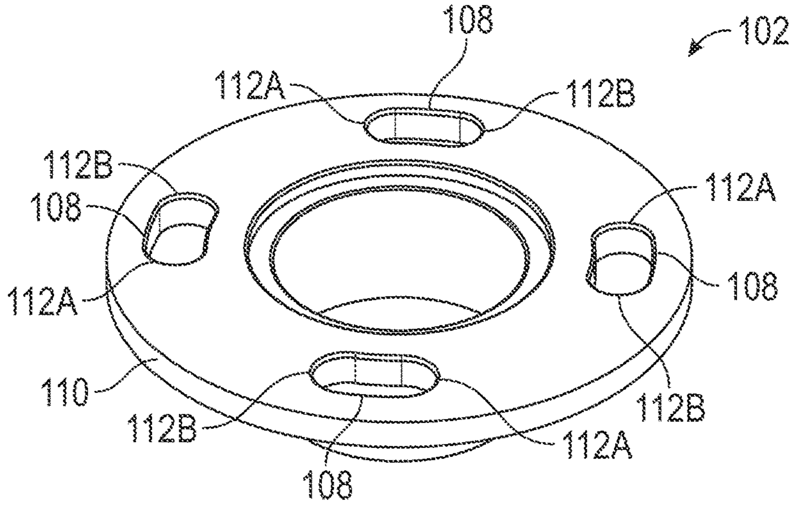
FIG. 3 is a perspective view of a base of the kiln flight of FIG. 1.
Figure 4:
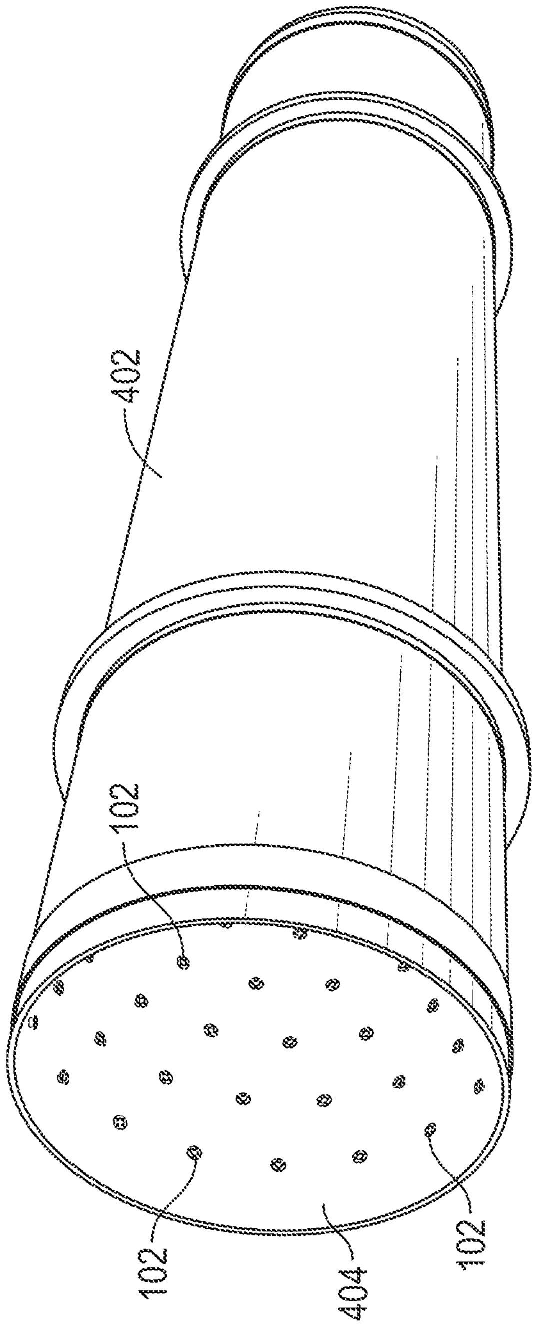
FIG. 4 is a perspective view of the base of FIG. 3 on a kiln of a kiln system according to aspects of the current disclosure.

In various examples, the base 102 is secured to an inner surface 404 of a rotary kiln 402 through various suitable mechanisms including, but not limited to, welding, mechanical fasteners, and various other suitable mechanisms (see FIG. 4). As illustrated in FIG. 3, the base 102 defines one or more openings, such as base slots 108. The number of base slots 108 should not be considered limiting on the current disclosure. In some examples, the base 102 optionally includes a base flange 110, and the base slots 108 are defined on the base flange 110. In other examples, the base slots 108 may be defined at various other locations on the base 102. Each base slot 108 includes opposing ends 112A-B. In some cases, a distance between the ends 112A-B corresponds to a range of angular orientations at which the flight body 104 is positionable relative to the base 102. In other examples, in place of or in addition to the base slots 108, a plurality of openings may be provided at various intervals on the base flange 110 or other suitable location on the base 102. In such examples, each opening may correspond to a predefined angular orientation of the flight body 104 relative to the base 102. In other examples, various other angular orientation adjustment mechanisms may be utilized.

Referring to FIGS. 1, 2, 5, and 6, the flight body 104 includes a front surface 114, a back surface 116, and a body mounting flange 118. Optionally, the flight body 104 includes a cutout portion 126 that accommodates a portion of the base 102 (see FIGS. 2 and 6), although it need not be included in other examples.

The body mounting flange 118 connects the flight body 104 to the base 102 and includes one or more mounting slots or openings, such as mounting openings 120. When assembled, each mounting opening 120 is aligned with at least a portion of a corresponding base slot 108 of the base 102. A support 122 is positionable through each aligned mounting opening 120 and base slot 108 to rotatably secure the flight body 104 to the base 102. In various examples where the base slots 108 are elongate, each support 122 is movable between the opposing ends 112A-B to control and adjust the angular orientation of the flight body 104 relative to the base 102 as desired. In certain examples, each support 122 includes locking mechanisms to selectively maintain a position of the flight body 104 relative to the base 102 when the flight body 104 is positioned at a desired angular orientation. In various aspects, the supports 122 may be various support mechanisms for rotatably supporting the flight body 104 relative to the base 102 including, but not limited to, nuts and bolts, pins, snap engagements, or various other suitable mechanisms.

In some examples and as represented by arrow 124 in FIG. 1, the flight body 104 is rotatable from a base position to a maximum position (as well as various positions in between). In certain examples, the angular orientation of the flight body 104 in the maximum position relative to the base position is from about 0° to about 30°, such as about 0°, about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, and/or about 30°. In some examples, the angular orientation of the flight body 104 in the maximum position relative to the base position is from about 13° to about 15°. In other examples, the angular orientation of the flight body 104 in the maximum position relative to the base position may be greater than 30°.

Figure 2:
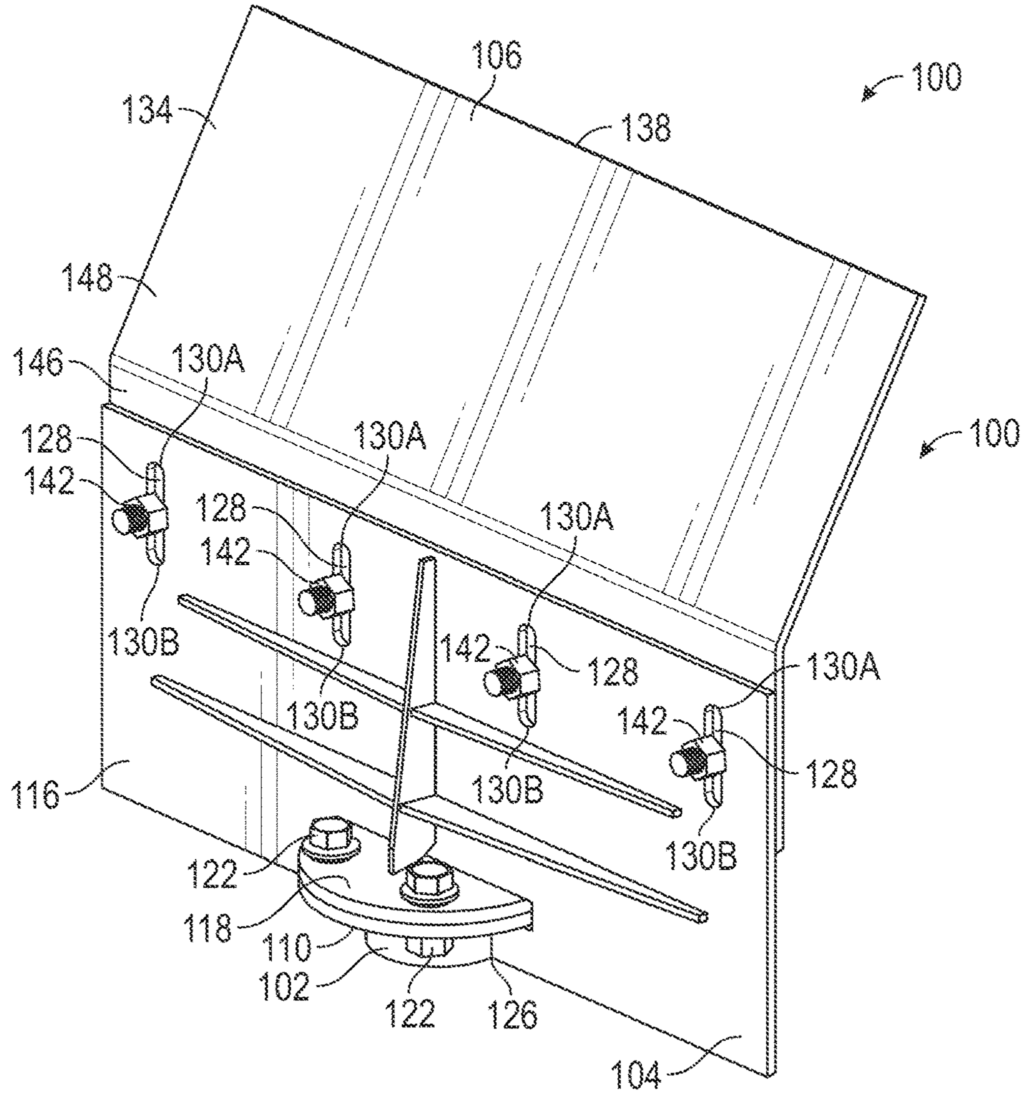
FIG. 2 is a rear perspective view of the kiln flight of FIG. 1.
Figure 5:
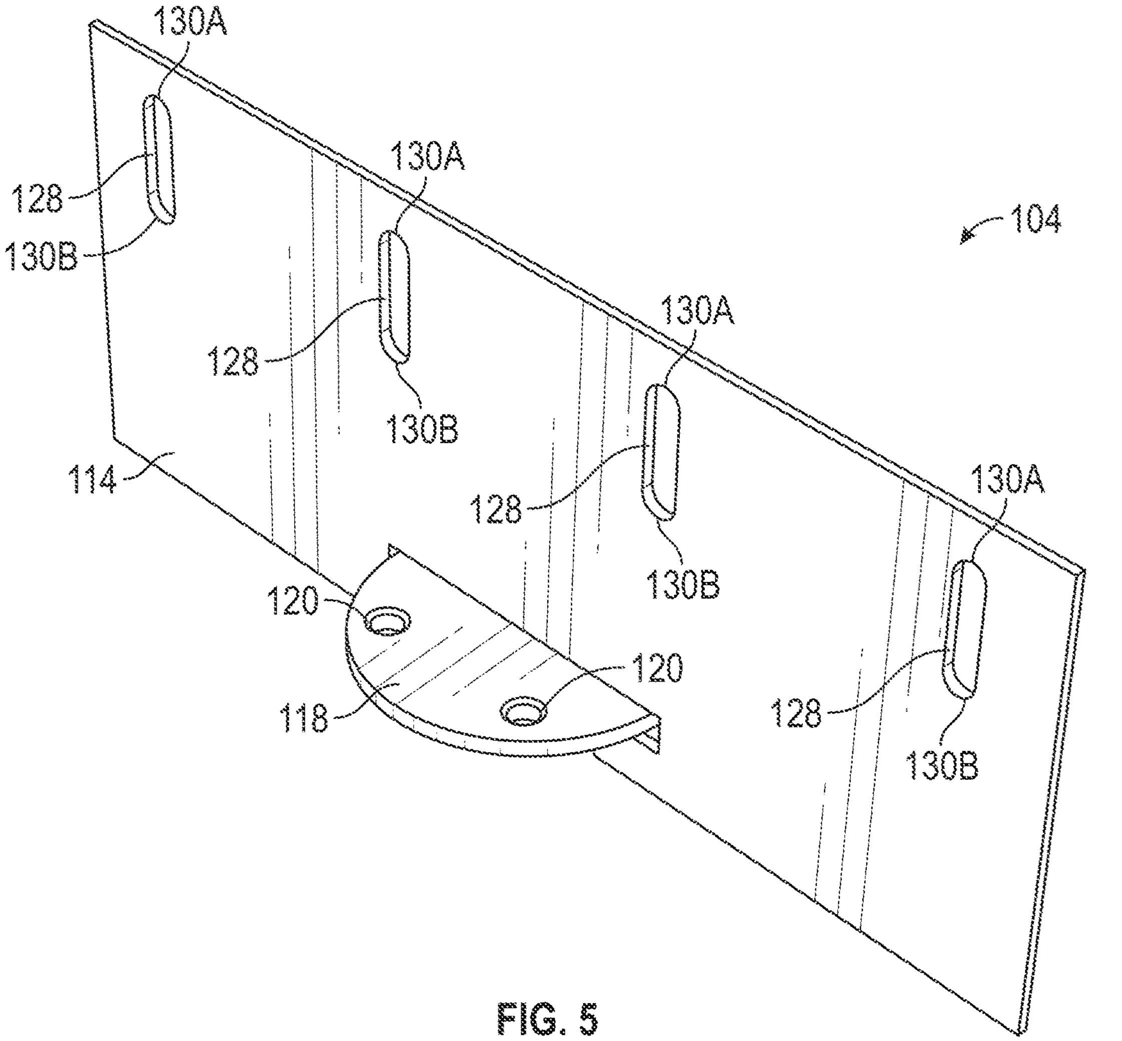
FIG. 5 is a perspective view of a flight body of the kiln flight of FIG. 1.
Figure 6:
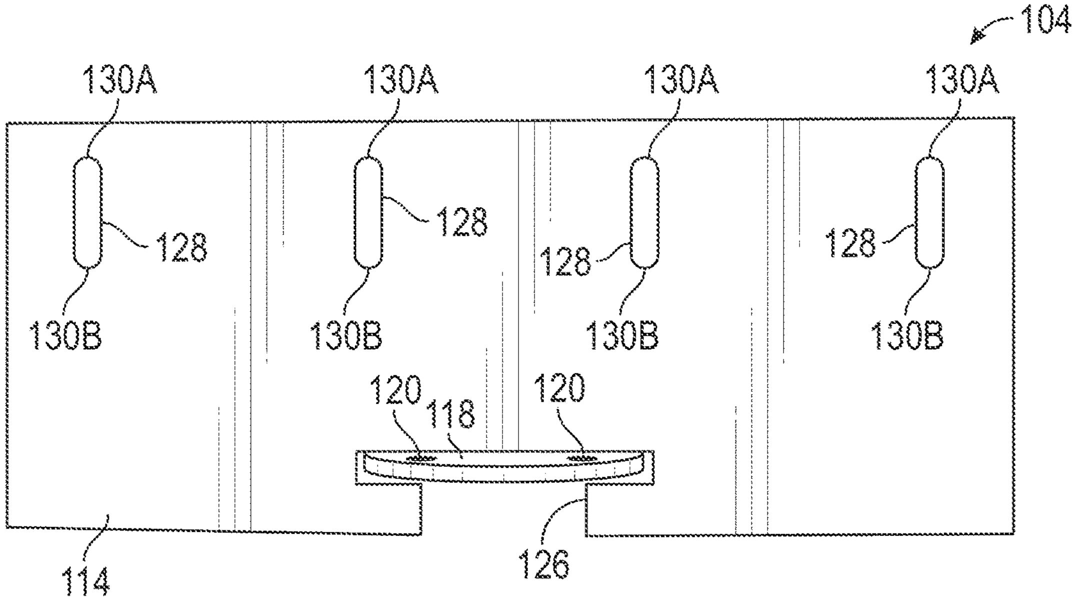
FIG. 6 is a front view of the flight body of FIG. 5.
Figure 7:
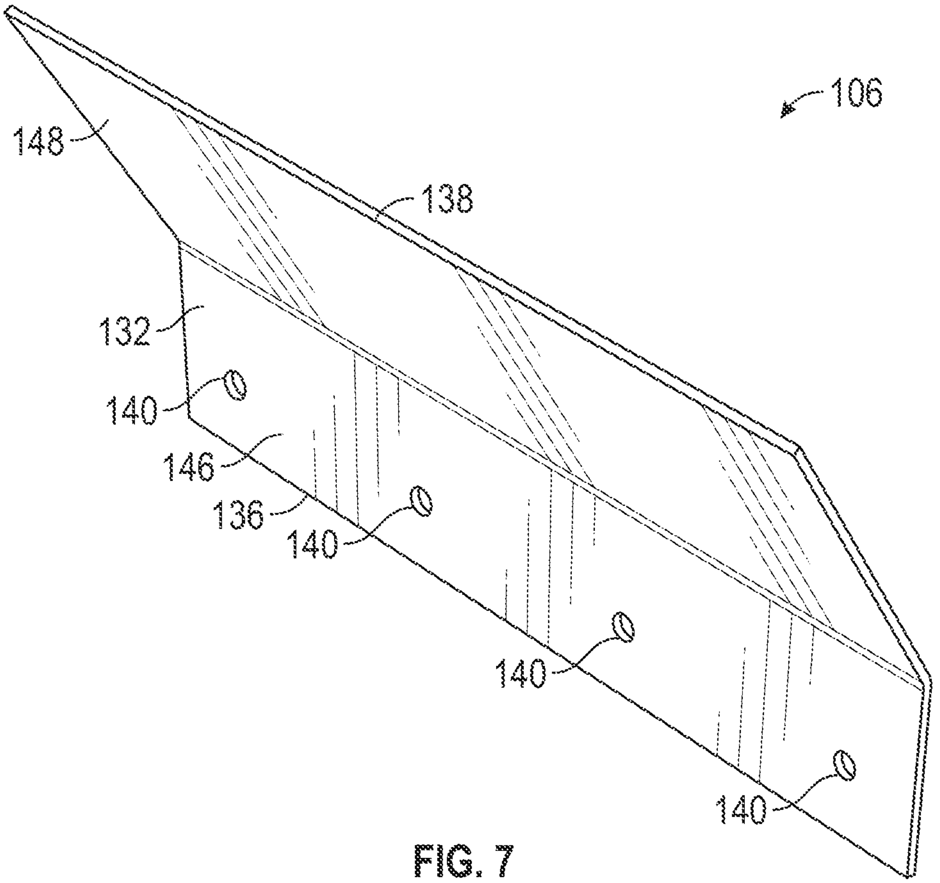
FIG. 7 is a perspective view of a height adjuster of the kiln flight of FIG. 1.
Figure 8:
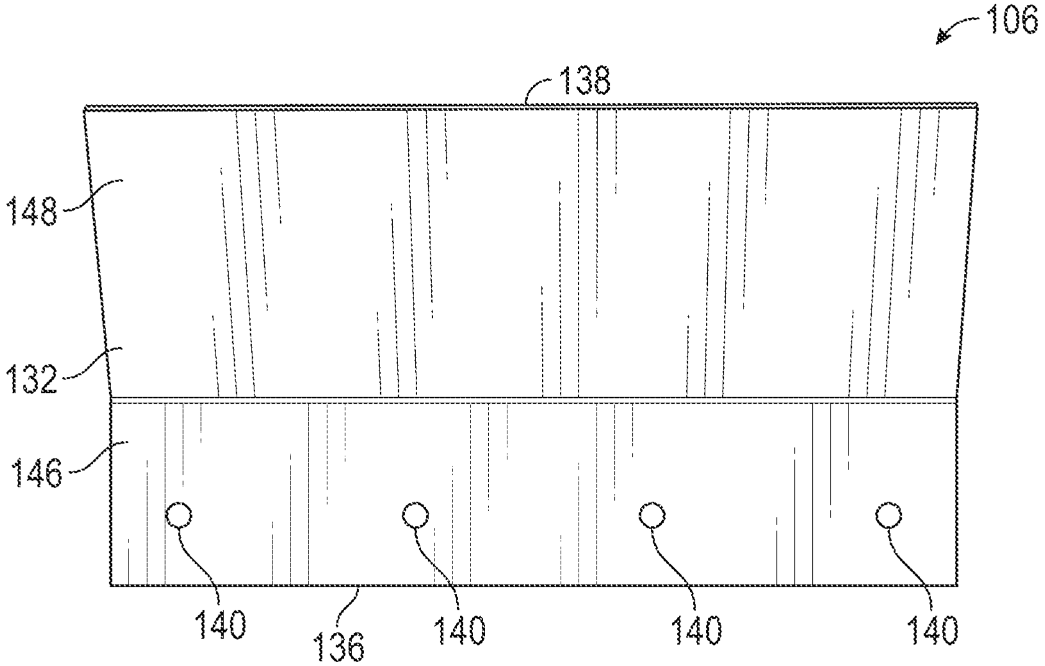
FIG. 8 is a front view of the height adjuster of FIG. 7.

As best illustrated in FIGS. 2, 5, and 6, in various examples, the flight body 104 includes one or more height adjustment openings, such as height adjustment slots 128. Each height adjustment slot 128 includes opposing ends 130A-B. In some examples, a distance between the ends 130A-B corresponds to a range of height positions at which the height adjuster 106 is positionable relative to the base 102 and/or relative to the flight body 104. In other examples, in place of or in addition to the height adjustment slots 128, a plurality of openings may be provided at various intervals on the flight body 104. In such examples, each opening may correspond to a predefined height of the flight 100. In other examples, various other height adjustment mechanisms may be utilized.

Referring to FIGS. 1, 2, 7, and 8, the height adjuster 106 includes a front surface 132, a back surface 134, a lower edge 136, and an upper edge 138. In certain examples, a distance between the upper edge 138 and the base 102 is a height of the flight 100. In other examples, when assembled in a kiln, a distance between the upper edge 138 and the inner surface of the kiln is a height of the flight 100. The height adjuster is linearly movably relative to the base 102 and the flight body 104 such that the height of the flight 100 is adjustable.

In some examples, the height adjuster 106 is supported on the flight body 104 such that a portion of the back surface 134 of the height adjuster 106 overlaps (and optionally abuts) a portion of the front surface 114 of the flight body 104 (see, e.g., FIGS. 1 and 2). In other examples, the height adjuster 106 may be supported on the flight body 104 in various other configurations. The height adjuster 106 includes one or more support slots or openings 140. When assembled, each support opening 140 is aligned with at least a portion of a corresponding height adjustment slot 128 of the flight body 104. A support 142 is positionable through each aligned support opening 140 and height adjustment slot 128 to secure the height adjuster 106 to the flight body 104 while allowing for selective linear movement of the height adjuster 106 relative to the flight body 104. In some examples, the support 142 is substantially similar to the support 122, although it need not be in other examples. Each support 142 is movable between the opposing ends 130A-B of the height adjustment slot 128 to control and adjust the height of the flight 100 as desired. Similar to the supports 122, each support 142 includes locking mechanisms to selectively maintain a position of the height adjuster 106 relative to the flight body 104 when the height adjuster 106 is positioned at a desired height.

In some examples and as represented by arrow 144 in FIG. 1, the height adjuster 106, is linearly movable between a minimum height and a maximum height, as well as various positions in between. In certain examples, a difference between the minimum height and the maximum height is from about 0 mm to about 50 mm, such as about 0 mm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, and/or about 50 mm. In other examples, the difference between the minimum height and the maximum height is greater than 50 mm. In some cases, the difference between the minimum height and the maximum height may be based on a diameter of the kiln, material to be processed, and/or various other factors.

As illustrated in FIGS. 1-3, the height adjuster 106 optionally includes one or more portions that are non-coplanar. In the example of FIGS. 1-3, the height adjuster 106 includes a first portion 146 and a second portion 148 that is non-coplanar with the first portion 146. In other examples, the height adjuster 106 may have a single portion (see FIG. 9) or more than two portions. Although the height adjuster 106 and the flight body 104 are illustrated as planar or including planar components, the shape of the height adjuster 106 and/or flight body 104 should not be considered limiting on the current disclosure. For example, the height adjuster 106 and/or the flight body 104 may be arcuate shaped, wavy, jagged, or have various other shapes as desired. In other examples, different portions of the height adjuster 106 and/or the flight body 104 may have different shapes as desired. Optionally, various suitable shapes or combinations of shapes may be used for the flight body 104 and/or height adjuster 106 while still allowing for the flight 100 to be rotatable and/or linearly adjustable.

Figure 9:
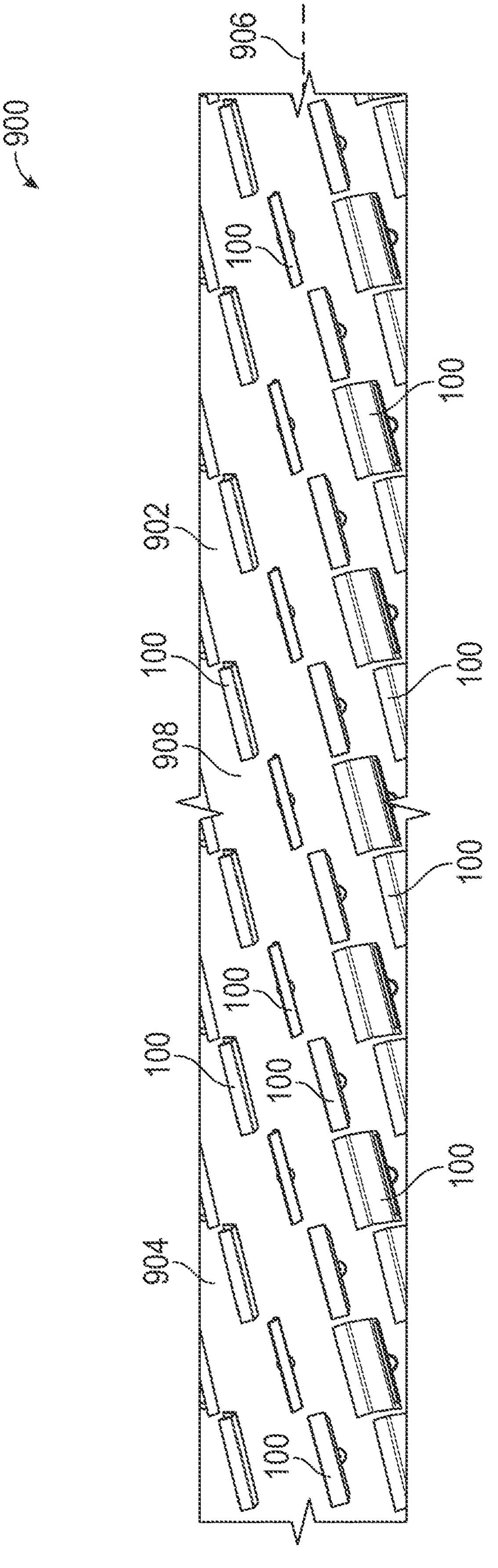
FIG. 9 is a sectional view of a rotary kiln system with a plurality of kiln flights according to aspects of the current disclosure.

FIG. 9 illustrates an example of a kiln system 900 with a plurality of flights 100 arranged on an inner surface 904 of a kiln 902. In certain examples, the kiln 902 is substantially similar to the kiln 402. As illustrated in FIG. 9, some of the flights 100 include height adjusters 106 with a single portion and other flights 100 include height adjusters with the two portions 146, 148.

The inner surface 904 of the kiln 902 defines a kiln chamber 908. A length and/or diameter of the kiln 902 may be varied as desired. The kiln 902 is rotatable about a central axis 906. A flow path through the kiln chamber 908 generally extends in the direction of the central axis 906. In some examples where the angular orientation of the flights 100 is adjustable, the base position of each flight 100 optionally corresponds to a position where the front surface of the flight body 104 faces a direction that is generally perpendicular to the central axis 906. In optional examples where the flight body 104 is substantially planar, the base position may correspond to a position where the flight body 104 is generally parallel to the central axis 906. In other examples, the base position may be at various other orientations relative to the central axis 906.

During processing, the flights 100 lift up and then drop scrap material in the kiln chamber 908 as the kiln 902 rotates. Through the flights 100, scrap material in the kiln chamber 908 is distributed both around the circumference of the kiln 902 and along a length of the kiln 902. The lifting and dropping of the scrap material also makes the scrap advance through the kiln chamber 908.

In various examples, the kiln system 900 is a decoating kiln system, and hot gas is circulated through the kiln chamber 908 to comingle with the scrap material and remove coatings from the scrap. The scrap's decoated quality may be based on residence time in the kiln. In various examples, the scrap residence time in the kiln system 900 may be controlled by adjusting or controlling the height of the flights 100 and/or the angular orientation of the flights 100. In certain examples, flights 100 having a greater height (i.e., and increase further into the kiln chamber 908) may increase residence time in the kiln system 900 compared to flights 100 having a smaller height. In various examples, flights 100 that are rotatably positioned to interfere more with the flow path of material through the kiln chamber 908 may increase residence time in the kiln system compared to flights positioned to interfere less with the flow path. As one non-limiting example where the base position of each flight 100 corresponds to a position where the front surface of the flight body 104 faces a direction that is generally perpendicular to the central axis 906, flights 100 in the base position may decrease residence time compared to flights 100 in the maximum position.

Optionally, in some examples, the kiln 902 includes one or more zones along the length of the kiln 902. In some examples, the zones are controlled or adjusted such that the scrap residence time in one zone is different from the scrap residence time in another zone. As one non-limiting example, the height, angular position, and/or profile of the flights 100 in one zone may be different from the height, angular position, and/or profile of the flights 100 in another zone.

Through the adjustable flights 100, a single kiln 902 may be adjusted and controlled to accommodate multiple types of scrap (e.g., heavy gauge sheet shreds, can scrap, automotive scrap, tetra-pack scrap, paper bonded to foil wrappers, gum wrappers, etc.) that may have different processing requirements (e.g., due to material, density, etc.).

Figure 10:
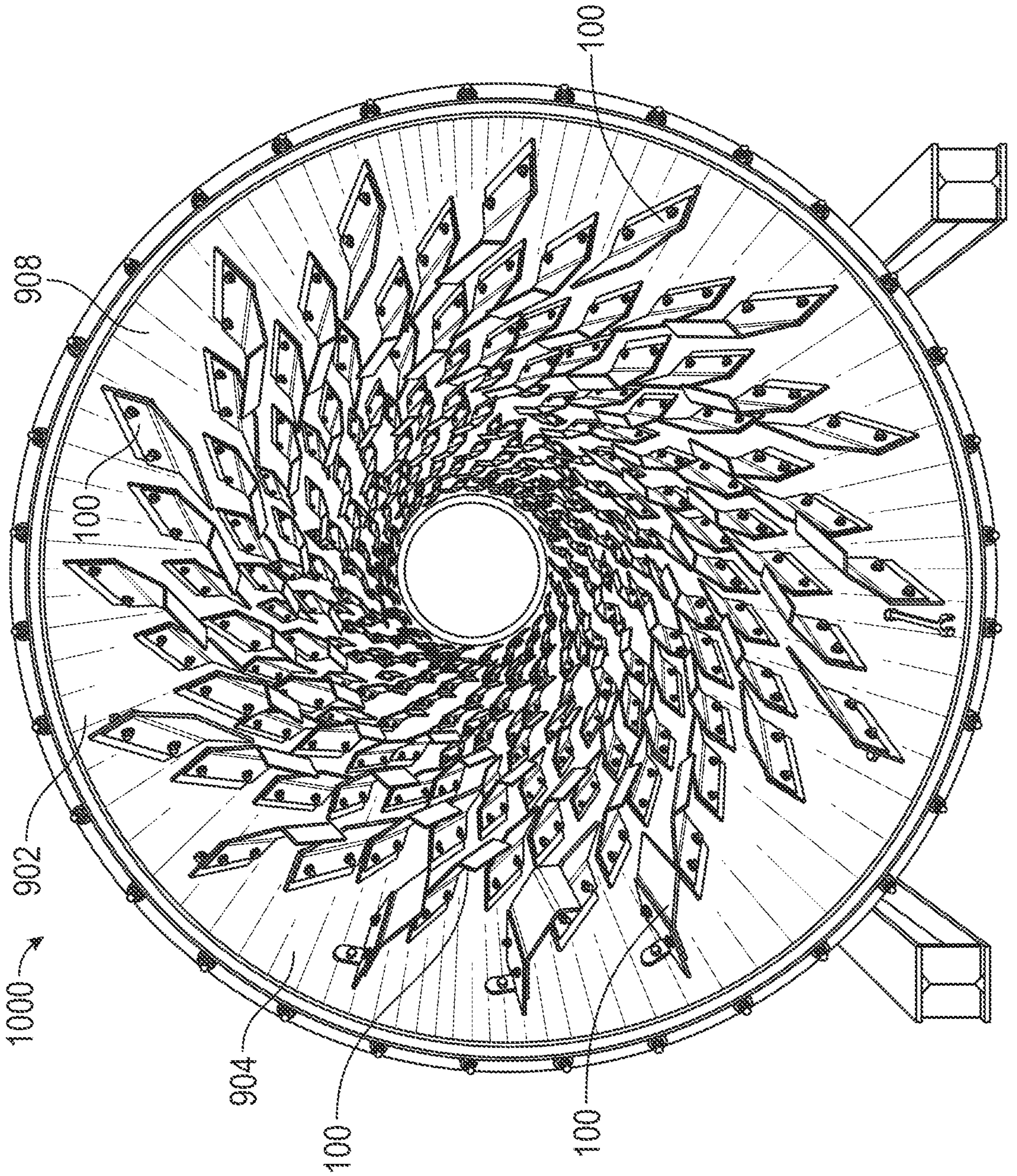
FIG. 10 illustrates an end view of a kiln having a plurality of kiln flights according to aspects of the current disclosure.
Figure 11:
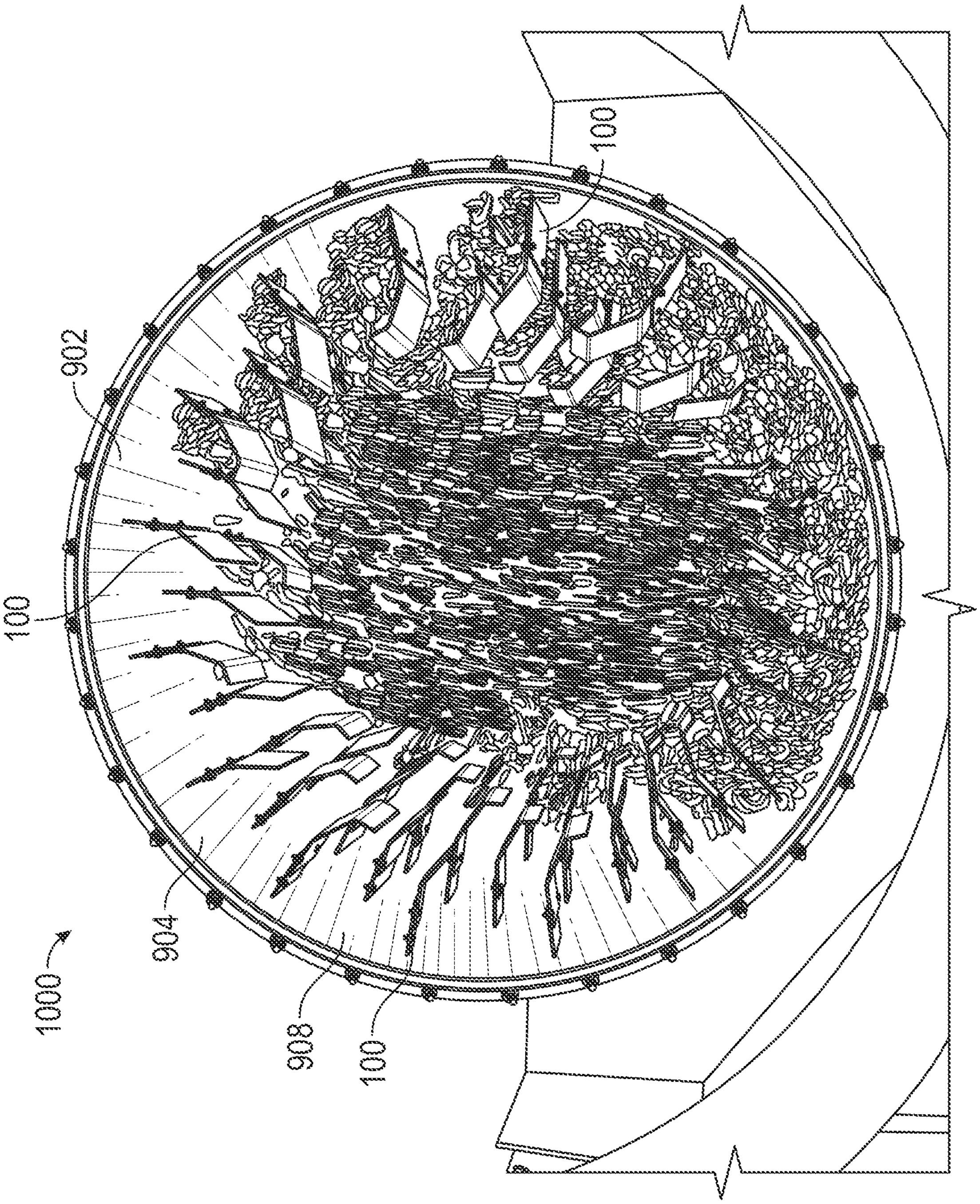
FIG. 11 illustrates an end view of the kiln of FIG. 10 mixing scrap material.

FIGS. 10 and 11 illustrate another example of a rotary kiln system 1000 that is substantially similar to the rotary kiln system 900. The rotary kiln system 500 includes an arrangement of flights 100 within the kiln chamber such that scrap material can be processed (see FIG. 11).

Methods of controlling the rotary kiln system 900 are also disclosed. In one example, the method includes supporting flights 100 on a base 102 that is secured to the inner surface 904 of the rotary kiln 902. The method also includes adjusting a height of the flight 100 and/or an angular orientation of the flight 100 relative to the inner surface 904 after supporting the flight 100 on the base 102. In various examples, the height of the flight 100 and/or the angular orientation of the flight 100 are controlled to control a scrap residence time of scrap material processed by the kiln system 900.

In certain examples, the method includes adjusting a height and/or angular orientation of a plurality of flights 100. In some cases, adjusting the plurality of flights includes adjusting flights 100 in a first zone of the kiln 902 to a first height and/or a first angular orientation and adjusting flights in a second zone of the kiln 902 to a second height that is different from the first height and/or a second angular orientation that is different from the first angular orientation.

A rotary kiln with kiln flights according to the present disclosure is adjustable and controllable by controlling a least one setting (height, angle, type of height adjuster, etc.) of the kiln flight, and accordingly can better accommodate different types of material during processing.

In some cases, the height of one or more kiln flights may be adjustable. In certain cases, a shorter kiln flight engages the scrap material less than a taller kiln flight. In some aspects, the kiln flights may be adjusted to be taller for bulkier scrap material (i.e., a lower density scrap) and shorter for a heaver scrap (i.e., a higher density scrap) for processing at the same feed rate.

In various cases, the angle of one or more kiln flights may be adjustable to control the scrap advance rate through the kiln and the amount of decoating. For example, in some cases, a smaller angle of the kiln flight may provide a faster scrap advance rate through the kiln, which means that the scrap has a shorter residence time within the kiln, has a shorter heat exchange time, and as such less decoating may occur. Conversely, in some cases, a larger angle of the kiln flight may provide a slower scrap advance rate through the kiln, which means that the scrap has a longer residence time within the kiln, has a longer heat exchange time, and as such more decoating may occur.

In other examples, the type of height adjuster on the flight body may be adjusted and controlled. In certain cases, the angle or shape of the height adjuster may control the drop points of the scrap material within the kiln. In various aspects, the angle or shape of the height adjuster may be controlled to achieve good scrap distribution across the kiln.

In various aspects, the base, the flight body, and the height adjuster of each kiln flight may be replaceable separately or partially. The separate components that are individually replaceable allows for the setting of the flights (e.g., height, angle, type of height adjuster) to be quickly changed and adapted in response to changes in scrap type, scrap density, and/or scrap qualities, among others. In other words, the kiln flights are easily adjustable or changeable to various combinations of setting depending on scrap type, scrap density, and/or scrap quality, among others.

A collection of exemplary examples, including at least some explicitly enumerated as "Examples" providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1. A kiln flight for a rotary kiln comprising: a base configured to be secured to a rotary kiln surface; and a flight body rotatably supported on the base such that an angular orientation of the flight body is adjustable.

Example 2. The kiln flight of any of the preceding or subsequent examples, wherein the angular orientation of the flight body is adjustable between a maximum position and a base position.

Example 3. The kiln flight of any of the preceding or subsequent examples, wherein a difference between the maximum position and the base position is from about 0° to about 30°.

Example 4. The kiln flight of any of the preceding or subsequent examples, wherein the difference between the maximum position and the base position is from about 13° to about 15°.

Example 5. The kiln flight of any of the preceding or subsequent examples, wherein the base comprises a plurality of openings, and wherein the flight body comprises a plurality of supports, each support movable within a corresponding opening such that the angular orientation of the flight body is adjustable.

Example 6. The kiln flight of any of the preceding or subsequent examples, further comprising a height adjuster movably supported on the flight body such that a height of the kiln flight is adjustable.

Example 7. The kiln flight of any of the preceding or subsequent examples, wherein the flight body defines a plurality of height slots, and wherein the height adjuster comprises a plurality of height supports, each height support movable within a corresponding height opening such that the height of the kiln flight is adjustable.

Example 8. The kiln flight of any of the preceding or subsequent examples, wherein the height adjuster is slidably supported on the flight body.

Example 9. The kiln flight of any of the preceding or subsequent examples, wherein the height adjuster comprises an upper edge, and wherein a distance from the upper edge to the base is the height of the kiln flight.

Example 10. The kiln flight of any of the preceding or subsequent examples, wherein the height adjuster comprises a first portion and a second portion, wherein the second portion comprises the upper edge, wherein the first portion is slidably supported on the flight body, and wherein the second portion and first portion are non-coplanar.

Example 11. A kiln flight for a rotary kiln comprising: a base; and a height adjuster movably supported relative to the base and comprising an upper edge, wherein a distance from the upper edge to the base is a height of the kiln flight, and wherein the height adjuster is movable relative to the base such that the height of the kiln flight is adjustable.

Example 12. The kiln flight of any of the preceding or subsequent examples, wherein the height adjuster comprises a first portion and a second portion, wherein the second portion comprises the upper edge, and wherein the second portion and first portion are non-coplanar.

Example 13. The kiln flight of any of the preceding or subsequent examples, further comprising a flight body rotatably supported on the base such that an angular orientation of the flight body is adjustable, wherein the height adjuster is movably supported to the flight body.

Example 14. The kiln flight of any of the preceding or subsequent examples, wherein the angular orientation of the flight body is adjustable between a maximum position and a base position.

Example 15. The kiln flight of any of the preceding or subsequent examples, wherein a difference between the maximum position and the base position is from about 0° to about 30°.

Example 16. The kiln flight of any of the preceding or subsequent examples, wherein the difference between the maximum position and the base position is from about 13° to about 15°.

Example 17. The kiln flight of any of the preceding or subsequent examples, wherein the base comprises a plurality of openings, and wherein the flight body comprises a plurality of supports, each support movable within a corresponding opening such that the angular orientation of the flight body is adjustable.

Example 18. The kiln flight of any of the preceding or subsequent examples, wherein the flight body defines a plurality of height slots, and wherein the height adjuster comprises a plurality of height supports, each height support movable within a corresponding height opening such that the height of the kiln flight is adjustable.

Example 19. The kiln flight of any of the preceding or subsequent examples, wherein the height adjuster is slidably supported on the flight body.

Example 20. The kiln flight of any of the preceding or subsequent examples, wherein the height of the kiln flight is adjustable between a maximum height and a minimum height.

Example 21. A rotary kiln system comprising: a rotary kiln comprising an inner kiln surface and defining a central axis; and an adjustable kiln flight comprising: a base secured to the inner kiln surface; and a flight body rotatably supported on the base such that an angular orientation of the flight body relative to the central axis is adjustable.

Example 22. The rotary kiln system of any of the preceding or subsequent examples, wherein the angular orientation of the flight body is adjustable between a maximum position and a base position relative to the central axis.

Example 23. The rotary kiln system of any of the preceding or subsequent examples, wherein a difference between the maximum position and the base position is from about 0° to about 30°.

Example 24. The rotary kiln system of any of the preceding or subsequent examples, wherein the difference between the maximum position and the base position is from about 13° to about 15°.

Example 25. The rotary kiln system of any of the preceding or subsequent examples, wherein the base comprises a plurality of openings, and wherein the flight body comprises a plurality of supports, each support movable within a corresponding opening such that the angular orientation of the flight body is adjustable.

Example 26. The rotary kiln system of any of the preceding or subsequent examples, wherein the adjustable kiln flight further comprises a height adjuster, the height adjuster comprising an upper edge, wherein a distance from the upper edge to the inner kiln surface is a height of the adjustable kiln flight, and wherein the height adjuster is movably supported on the flight body such that the height of the adjustable kiln flight is adjustable.

Example 27. The rotary kiln system of any of the preceding or subsequent examples, wherein the flight body defines a plurality of height slots, and wherein the height adjuster comprises a plurality of height supports, each height support movable within a corresponding height opening such that the height of the adjustable kiln flight is adjustable.

Example 28. The rotary kiln system of any of the preceding or subsequent examples, wherein the height adjuster is slidably supported on the flight body.

Example 29. The rotary kiln system of any of the preceding or subsequent examples, wherein the height adjuster comprises a first portion and a second portion, wherein the second portion comprises the upper edge, wherein the first portion is slidably supported on the flight body, and wherein the second portion and first portion are non-coplanar.

Example 30. The rotary kiln system of any of the preceding or subsequent examples, wherein the base is welded to the inner kiln surface.

Example 31. The rotary kiln system of any of the preceding or subsequent examples, wherein the adjustable kiln flight is a first adjustable kiln flight of a plurality of adjustable kiln flights arranged on the inner kiln surface.

Example 32. The rotary kiln system of any of the preceding or subsequent examples, wherein the rotary kiln comprises a first zone and a second zone each comprising adjustable kiln flights, wherein the angular orientation of the adjustable kiln flights in the first zone is a first angular orientation, and wherein the angular orientation of the adjustable kiln flights in the second zone is a second angular orientation different from the first angular orientation.

Example 33. A rotary kiln system comprising: a rotary kiln comprising an inner kiln surface; and an adjustable kiln flight comprising: a base secured to the inner kiln surface; and a height adjuster movably supported relative to the base and comprising an upper edge, wherein a distance from the upper edge to the inner kiln surface is a height of the adjustable kiln flight, and wherein the height adjuster is movable relative to the base such that the height of the adjustable kiln flight is adjustable.

Example 34. The rotary kiln system of any of the preceding or subsequent examples, wherein the height adjuster comprises a first portion and a second portion, wherein the second portion comprises the upper edge, and wherein the second portion and first portion are non-coplanar.

Example 35. The rotary kiln system of any of the preceding or subsequent examples, wherein the rotary kiln defines a central axis and wherein the adjustable kiln flight further comprises a flight body rotatably supported on the base such that an angular orientation of the flight body relative to the central axis is adjustable, wherein the height adjuster is movably supported to the flight body.

Example 36. The rotary kiln system of any of the preceding or subsequent examples, wherein the angular orientation of the flight body is adjustable between a maximum position and a base position.

Example 37. The rotary kiln system of any of the preceding or subsequent examples, wherein a difference between the maximum position and the base position from about 0° to about 30°.

Example 38. The rotary kiln system of any of the preceding or subsequent examples, wherein the difference between the maximum position and the base position is from about 13° to about 15°.

Example 39. The rotary kiln system of any of the preceding or subsequent examples, wherein the base comprises a plurality of openings, and wherein the flight body comprises a plurality of supports, each support movable within a corresponding opening such that the angular orientation of the flight body is adjustable.

Example 40. The rotary kiln system of any of the preceding or subsequent examples, wherein the flight body defines a plurality of height slots, and wherein the height adjuster comprises a plurality of height supports, each height support movable within a corresponding height opening such that the height of the adjustable kiln flight is adjustable.

Example 41. The rotary kiln system of any of the preceding or subsequent examples, wherein the height adjuster is slidably supported on the flight body.

Example 42. The rotary kiln system of any of the preceding or subsequent examples, wherein the height of the adjustable kiln flight is adjustable between a maximum height and a minimum height.

Example 43. The rotary kiln system of any of the preceding or subsequent examples, wherein the base is welded to the inner kiln surface.

Example 44. The rotary kiln system of any of the preceding or subsequent examples, wherein the adjustable kiln flight is a first adjustable kiln flight of a plurality of adjustable kiln flights arranged on the inner kiln surface.

Example 45. The rotary kiln system of any of the preceding or subsequent examples, wherein the rotary kiln comprises a first zone and a second zone each comprising adjustable kiln flights, wherein the height of the adjustable kiln flights in the first zone is a first height, and wherein the height of adjustable kiln flights in the second zone is a second height different from the first height.

Example 46. A method of controlling a rotary kiln comprising: supporting a kiln flight on a base secured to an inner kiln surface of a rotary kiln; and adjusting a height of the kiln flight relative to the inner kiln surface after supporting the kiln flight on the base, wherein the height of the kiln flight is a distance between an upper edge of the kiln flight and the inner kiln surface.

Example 47. The method of any of the preceding or subsequent examples, further comprising adjusting an angular orientation of the kiln flight relative to the base.

Example 48. The method of any of the preceding or subsequent examples, wherein adjusting the angular orientation comprises rotating a flight body of the kiln flight relative to the base.

Example 49. The method of any of the preceding or subsequent examples, wherein the kiln flight is a first kiln flight of a plurality of kiln flights, wherein adjusting the height of the kiln flight comprises adjusting the height of each kiln flight of the plurality of kiln flights.

Example 50. The method of any of the preceding or subsequent examples, wherein adjusting the height of each kiln flight comprises adjusting kiln flights in a first zone of the rotary kiln to a first height and adjusting kiln flights in a second zone of the rotary kiln to a second height different from the first height.

Example 51. A method of controlling a rotary kiln comprising: supporting a kiln flight on a base secured to an inner kiln surface of a rotary kiln; and adjusting an angular orientation of the kiln flight relative to a central axis of the rotary kiln after supporting the kiln flight on the base.

Example 52. The method of any of the preceding or subsequent examples, wherein adjusting the angular orientation comprises rotating a flight body of the kiln flight relative to the base.

Example 53. The method of any of the preceding or subsequent examples, further comprising adjusting a height of the kiln flight relative to the inner kiln surface after supporting the kiln flight on the base, wherein the height of the kiln flight is a distance between an upper edge of the kiln flight and the inner kiln surface.

Example 54. The method of any of the preceding or subsequent examples, wherein the kiln flight is a first kiln flight of a plurality of kiln flights, wherein adjusting the angular orientation of the kiln flight comprises adjusting the angular orientation of each kiln flight of the plurality of kiln flights.

Example 55. The method of any of the preceding or subsequent examples, wherein adjusting the angular orientation of each kiln flight comprises adjusting kiln flights in a first zone of the rotary kiln to a first angular orientation and adjusting kiln flights in a second zone of the rotary kiln to a second angular orientation different from the first angular orientation.

Example 56. A kiln flight for a rotary kiln comprising: a base configured to be secured to a rotary kiln surface; and a body assembly movably supported on the base such that the body assembly is adjustable relative to the base.

Example 57. The kiln flight of any of the preceding or subsequent examples, wherein the body assembly comprises a flight body rotatably supported on the base such that an angular orientation of the flight body is adjustable relative to the base.

Example 58. The kiln flight of any of the preceding or subsequent examples, wherein the angular orientation of the flight body is adjustable between a maximum position and a base position.

Example 59. The kiln flight of any of the preceding or subsequent examples, wherein a difference between the maximum position and the base position is from about 0° to about 30°.

Example 60. The kiln flight of any of the preceding or subsequent examples, wherein the base comprises a plurality of openings, and wherein the flight body comprises a plurality of supports, each support movable within a corresponding opening such that the angular orientation of the flight body is adjustable relative to the base.

Example 61. The kiln flight of any of the preceding or subsequent examples, wherein the body assembly comprises a height adjuster, wherein the height adjuster comprises an upper edge, wherein a distance from the upper edge to the base is a height of the kiln flight, and wherein the height adjuster is movably supported relative to the base such that the height of the kiln flight is adjustable.

Example 62. The kiln flight of any of the preceding or subsequent examples, wherein the body assembly further comprises a flight body, and wherein the height adjuster is movably supported on the flight body such that the height of the kiln flight is adjustable.

Example 63. The kiln flight of any of the preceding or subsequent examples, wherein the flight body defines a plurality of height slots, and wherein the height adjuster comprises a plurality of height supports, each height support movable within a corresponding height opening such that the height of the kiln flight is adjustable.

Example 64. The kiln flight of any of the preceding or subsequent examples, wherein the height adjuster comprises a first portion and a second portion, wherein the second portion comprises the upper edge, wherein the first portion is slidably supported on the flight body, and wherein the second portion and first portion are non-coplanar.

Example 65. A rotary kiln system comprising: a rotary kiln comprising an inner kiln surface; and an adjustable kiln flight comprising: a base secured to the inner kiln surface; and a body assembly movably supported on the base such that the body assembly is adjustable relative to the inner kiln surface.

Example 66. The rotary kiln system of any of the preceding or subsequent examples, wherein the rotary kiln defines a central axis, and wherein the body assembly comprises a flight body rotatably supported on the base such that an angular orientation of the flight body relative to the central axis is adjustable.

Example 67. The rotary kiln system of any of the preceding or subsequent examples, wherein the angular orientation of the flight body is adjustable between a maximum position and a base position relative to the central axis, and wherein a difference between the maximum position and the base position is from about 0° to about 30°.

Example 68. The rotary kiln system of any of the preceding or subsequent examples, wherein the body assembly comprises a height adjuster comprising an upper edge, wherein a distance from the upper edge to the inner kiln surface is a height of the adjustable kiln flight, and wherein the height adjuster is movably supported relative to the base such that the height of the adjustable kiln flight is adjustable relative to the inner kiln surface.

Example 69. The rotary kiln system of any of the preceding or subsequent examples, wherein the rotary kiln defines a central axis, wherein the body assembly further comprises a flight body rotatably supported on the base such that an angular orientation of the flight body relative to the central axis is adjustable, and wherein the height adjuster is movably supported on the flight body.

Example 70. The rotary kiln system of any of the preceding or subsequent examples, wherein the base is fixed to the inner kiln surface.

Example 71. The rotary kiln system of any of the preceding or subsequent examples, wherein the adjustable kiln flight is a first adjustable kiln flight of a plurality of adjustable kiln flights arranged on the inner kiln surface, wherein the rotary kiln comprises a first zone and a second zone each comprising adjustable kiln flights, wherein an angular orientation or a height of the adjustable kiln flights in the first zone are different from an angular orientation or a height of the adjustable kiln flights in the second zone.

Example 72. A method of controlling a rotary kiln comprising: supporting a base of a kiln flight on an inner kiln surface of a rotary kiln, wherein the base is fixedly secured to the inner kiln surface; supporting a body assembly of the kiln flight on the base, wherein the body assembly is movable relative to the base and the inner kiln surface; and adjusting the body assembly of the kiln flight by moving the body assembly relative to the base.

Example 73. The method of any of the preceding or subsequent examples, wherein a height of the kiln flight is a distance between an upper edge of the kiln flight and the inner kiln surface, and wherein adjusting the body assembly comprises adjusting the height of the kiln flight.

Example 74. The method of any of the preceding or subsequent examples, further comprising adjusting an angular orientation of the body assembly relative to the base.

Example 75. The method of any of the preceding or subsequent examples, wherein the kiln flight is a first kiln flight of a plurality of kiln flights, wherein the rotary kiln comprises a first zone comprising kiln flights and a second zone comprising kiln flights, and wherein adjusting the body assembly comprises adjusting an angular orientation or a height of kiln flights in the first zone to a first orientation and adjusting an angular orientation or a height of kiln flights in the second zone to a second orientation that is different from the first orientation.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A kiln flight for a rotary kiln comprising:

a base, wherein a portion of the base is attachable to a rotary kiln surface; and a body assembly supported on the base and comprising a height adjuster coupled to and supported on base, wherein the height adjuster comprises an upper edge, wherein a distance from the upper edge to the portion of the base attachable to the rotary kiln surface is a height of the kiln flight, and wherein the height adjuster is linearly movable relative to the base while the height adjuster is coupled to the base such that the height of the kiln flight is adjustable.

2. The kiln flight of claim 1, wherein the height adjuster comprises a first portion and a second portion, wherein the second portion comprises the upper edge, and wherein the second portion and first portion are non-coplanar.

3. The kiln flight of claim 1, further comprising a flight body rotatably supported on the base such that an angular orientation of the flight body is adjustable, wherein the height adjuster is movably supported to the flight body.

4. The kiln flight of claim 3, wherein the angular orientation of the flight body is adjustable between a maximum position and a base position.

5. The kiln flight of claim 4, wherein a difference between the maximum position and the base position is from about 0° to about 30°.

6. The kiln flight of claim 3, wherein the base comprises a plurality of openings, and wherein the flight body comprises a plurality of supports, each support movable within a corresponding opening such that the angular orientation of the flight body is adjustable relative to the base.

7. The kiln flight of claim 1, further comprising a flight body supported on the base, wherein the height adjuster is coupled to and supported on the base by the flight body, wherein the flight body defines a plurality of height slots, and wherein the height adjuster comprises a plurality of height supports, each height support movable within a corresponding height slot such that the height of the kiln flight is adjustable.

8. The kiln flight of claim 7, wherein the height adjuster is slidably supported on the flight body.

9. The kiln flight of claim 1, wherein the height of the kiln flight is slidably or linearly adjustable between a maximum height and a minimum height.

10. A rotary kiln system comprising:

a rotary kiln comprising an inner kiln surface; and an adjustable kiln flight comprising:

a base secured to a portion of the inner kiln surface; and a height adjuster coupled to and supported on the base and comprising an upper edge spaced apart above and opposite from the portion of the kiln surface, wherein a distance from the upper edge to the portion of the inner kiln surface to which the base is secured is a height of the adjustable kiln flight, and wherein the height adjuster is linearly movable relative to the base while the height adjuster is supported on the base such that the height of the adjustable kiln flight is adjustable.

11. The rotary kiln system of claim 10, wherein the height adjuster comprises a first portion and a second portion, wherein the second portion comprises the upper edge, and wherein the second portion and first portion are non-coplanar.

12. The rotary kiln system of claim 10, wherein the rotary kiln defines a central axis and wherein the adjustable kiln flight further comprises a flight body rotatably supported on the base such that an angular orientation of the flight body relative to the central axis is adjustable, wherein the height adjuster is movably supported to the flight body.

13. The rotary kiln system of claim 12, wherein the angular orientation of the flight body is adjustable between a maximum position and a base position, wherein a difference between the maximum position and the base position from about 0° to about 30°.

14. The rotary kiln system of claim 10, wherein the adjustable kiln flight further comprises a flight body, wherein the height adjuster is coupled to and supported on the base by the flight body, wherein the flight body defines a plurality of height slots, and wherein the height adjuster comprises a plurality of height supports, each height support movable within a corresponding height slot such that the height of the adjustable kiln flight is adjustable.

15. The rotary kiln system of claim 14, wherein the height adjuster is slidably supported on the flight body.

16. The rotary kiln system of claim 10, wherein the base is fixed to the inner kiln surface.

17. A method of controlling a rotary kiln comprising adjusting a height of a kiln flight supported on a base secured to a portion of an inner kiln surface of the rotary kiln by linearly moving a height adjuster of the kiln flight while the height adjuster is coupled to and supported by the base, wherein the height of the kiln flight is a distance between an upper edge of the kiln flight and the portion of the inner kiln surface to which the base is secured.

18. The method of any of claim 17, further comprising adjusting an angular orientation of the kiln flight relative to the base.

19. The method of claim 17, wherein the kiln flight is a first kiln flight of a plurality of kiln flights, wherein adjusting the height of the kiln flight comprises adjusting the height of each kiln flight of the plurality of kiln flights.

20. The method of any of claim 19, wherein adjusting the height of each kiln flight comprises adjusting at least one kiln flight of the plurality of kiln flights in a first zone of the rotary kiln to a first height and adjusting at least one kiln flight of the plurality of kiln flights in a second zone of the rotary kiln to a second height different from the first height.

* * * * *